(12) United States Patent
Pathare et al.

(10) Patent No.: US 11,700,854 B2
(45) Date of Patent: Jul. 18, 2023

(54) SILVER ANTIMICROBIALS

(71) Applicant: Melzer Chemicals Pvt. Ltd., Pune (IN)

(72) Inventors: Prakash Pathare, Pune (IN); Sheeba Swaminathan, Pune (IN)

(73) Assignee: MELZER CHEMICALS PVT. LTD., Pune (IN)

( * ) Notice: Subject to any disclaimer, the term of this patent is extended or adjusted under 35 U.S.C. 154(b) by 0 days.

(21) Appl. No.: 17/592,641

(22) Filed: Feb. 4, 2022

(65) Prior Publication Data
US 2022/0151238 A1 May 19, 2022

(51) Int. Cl.
| | | |
|---|---|---|
| A01N 59/00 | (2006.01) | |
| A01N 25/22 | (2006.01) | |
| A01N 25/12 | (2006.01) | |

(52) U.S. Cl.
CPC ............. *A01N 59/00* (2013.01); *A01N 25/12* (2013.01); *A01N 25/22* (2013.01)

(58) Field of Classification Search
CPC ......... A01N 59/00; A01N 25/12; A01N 25/22
See application file for complete search history.

(56) References Cited

PUBLICATIONS

Raveendran, P., Completely "Green" Synthesis and Stabilization of Metal Nanoparticles, 2003, J. Am. Chem. Soc., vol. 125, vol. 46, pp. 13940-13941. (Year: 2003).*
Francis, L., Hydroxy propyl cellulose capped silver nanoparticles produced by simple dialysis process, 2010, Materials Research Bulletin, vol. 45, pp. 989-992. (Year: 2010).*
Suvarna, S., Synthesis of a novel glucose capped gold nanoparticle as a better theranostic candidate, 2017, PLOS One, vol. 12, Issue 6: e0178202, pp. 1-15. (Year: 2017).*
Manjeet Singh et al., Role of pH in the green synthesis of silver nanoparticles, Materials Letters, vol. 63, Issues 3-4, Feb. 15, 2009, pp. 425-427.
Amrut S. Lanje et al., Synthesis of silver nanoparticles: A safer alternative to conventional antimicrobial and antibacterial agents, J. Chem. Pharm. Res., 2010, 2(3):pp. 478-483.
Kamyar Shameli et al., Synthesis and Characterization of Polyethylene Glycol Mediated Silver Nanoparticles by the Green Method, Int. J Mol. Sci. 2012, 13, pp. 6639-6650.
Endang Susilowati et al., Synthesis of silver-chitosan nanocomposites colloidal by glucose as reducing agent, Indones. J. Chem., 2015, vol. 15 (1), pp. 29-35. Abstract.
Mohammad Nahid Siddiqui et al., Green Synthesis of Silver Nanoparticles and Study of Their Antimicrobial Properties, J Polym Environ, 2018, 26, pp. 423-433. Abstract.
Xianghua Gao et al., Green synthesis and characteristic of core-shell structure silver/starch nanoparticles, Materials Letters, vol. 65, Issues 19-20, Oct. 2011, pp. 2963-2965. Abstract.
Atiqah Salleh at al., The Potential of Silver Nanoparticles for Antiviral and Antibacterial Applications: A Mechanism of Action, Nanomaterials, Aug. 9, 2020, 10, 1566, pp. 1-20.
International Search Report, PCT/IN2021/050845, pp. 1-3, dated Dec. 13, 2021.

* cited by examiner

*Primary Examiner* — Erin E Hirt
(74) *Attorney, Agent, or Firm* — FisherBroyles, LLP; Susan M. Oiler (57) ABSTRACT

Disclosed is a method for synthesizing an antimicrobial base. The method comprises treating a Silver salt in a reaction mixture. The method further comprises adding one or more reactants to the reaction mixture in a pre-defined ratio. Further, the method comprises heating the reaction mixture at a first temperature between 45° C. to 90° C. for a first period of 5 to 8 hours. Furthermore, the method comprises stabilizing the conversion by adding a ligand and a stabilizing agent. Subsequently, the method comprises digesting the reaction mixture at a second temperature between 45° C. to 65° C. for a period of 2 to 4 hours to form an end product. Finally, the method comprises filtering the reaction mixture. The sub-micron particle forms a dispersion containing the colloidal silver particles ($Ag^0$), thereby forming the antimicrobial base.

5 Claims, 4 Drawing Sheets

SILVER ANTIMICROBIALS

PRIORITY INFORMATION

The present application claims priority from an Indian patent application no-202121030579 filed on 7 Jul. 2021.

TECHNICAL FIELD

The present subject matter described herein, in general, relates to antimicrobial base. More particularly, the disclosure relates to Silver antimicrobials, synthesis methods and uses thereof.

BACKGROUND

Over the recent years, increasing need is felt to use an anti-microbial for avoiding microbial spoilage of industrial products which are used by large consumer base. At the same time, there is an increasing awareness towards the likely adverse effects of the antimicrobials on human and the environment. The adverse effects are caused due to excessive and unrestricted usage of the anti-microbials in the industrial products. Therefore, a lot of work has been going on to explore availability of alternative anti-microbials working at low dosage thus becoming safe for the human and the environment.

In furtherance to the above background, by ancient knowledge about the anti-microbial activity of Silver, several attempts were made for augmenting the usage of Silver in antimicrobials. With the advent of modern technology, easy-to-handle forms of Silver were developed, and this led to availability of the Silver antimicrobials in the market for commercial use.

In last decade, a few such commercial products got introduced, which were based on ionisable Silver. The ionisable Silver based products utilized selective salts of Silver to formulate anti-microbial compositions using multiple techniques. In such formulations, Silver in ionic form has been expected to act against microbes. However, silver in ionic form has also been reported to cause severe skin problems.

Generally, it is known that microbes cannot grow on the surface of Silver due to the electrochemical potential of the surface of Silver. Hence, Silver was naturally a choice for synthesizing nano particles as the nanoparticles may provide much larger surface area on which several microbes may settle but fail to grow. Accordingly, nano particles of Silver were used as forming the base of some antimicrobials. However, presence of associated impurities originating from the chemicals used for deriving nano particles of Silver became newer toxicity concerns. Eliminating such associated impurities, without disturbing the status of nano particles formed, is a major problem.

Furthermore, concerns on multiple ill-effects getting initiated due to usage of Silver nanoparticles have been raised. For instance, accidental inhalation of nanoparticles, through the sprays created for some usages or direct contact of nanoparticles on skin have been shown to cause ill effects. The awareness on ill effects led to the thought of introducing regulatory controls on the usage of nano particles. Hence, overcoming the limitations and ill effects of nanoparticles became essential.

SUMMARY

Before the present system(s) and method(s), are described, it is to be understood that this application is not limited to the particular system(s), and methodologies described, as there can be multiple possible embodiments which are not expressly illustrated in the present disclosure. It is also to be understood that the terminology used in the description is for the purpose of describing the particular implementations or versions or embodiments only and is not intended to limit the scope of the present application. This summary is provided to introduce aspects related to a system and a method for synthesizing an antimicrobial base. This summary is not intended to identify essential features of the claimed subject matter nor is it intended for use in determining or limiting the scope of the claimed subject matter.

In one implementation, a method for synthesizing an antimicrobial base of sub-micron size Silver in aqueous phase is disclosed. In order to synthesize the antimicrobial base, initially at least one Silver salt may be treated with one or more reactants like a plurality of monosaccharides in an aqueous reaction mixture. The Silver salt may be water soluble. Further, a monosaccharide like Glucose and at least one modified polysaccharide may be used to form reactive agent along with the monosaccharide, or even without it. The derivative of the polysaccharide may be water soluble, or may be converted to become water soluble by carrying out certain reaction known in chemistry or in a typical case by adjusting pH of the reaction-mix to alkaline ranges. Further, the polysaccharide may comprise a linear chain of β linked D-glucosamine and N-acetyl-glucosamine. The one or more reactants may be used about 3 to 8 times in equivalent to the Silver salt. Individually, the reactants may be in 1:1 ratio to each other, but primary polysaccharide like Glucose may be preferred to be present in excess. The modified polysaccharide may comprise a linear chain of β linked D-glucose units, and the reaction medium may be made alkaline to pH from 8.0 to 10.5, more conveniently from 8.2 to 9.5 depending on temperature of the reaction. The temperature between 45° C. to 90° C. for a first period of 5 to 8 hours is sufficient for the said conversion. Further, the temperature between 50 to 65° C. may be maintained with certain ratio of the reactive agents. Further, the sub-micron size Silver particles getting formed by reduction of the Silver salt may be stabilized with another cellulosic agent, which may lead to build-up of viscosity of the reaction mix, as also at least one ligand may be used to stabilise the sub-micron particles of Silver getting formed in the reaction. Further, the ligand may be a glycolic derivative. The neutralizer may be a buffering solution. Furthermore, the reaction mix may be digested between 45° C. to 65° C. for a period of 2 to 4 hours to form an end product. Subsequently, the reaction mix may be filtered to separate into micron particles and sub-micron particles. The latter form finally a stable colloidal dispersion in aqueous phase. Finally, the said colloidal dispersion of sub-micron size Silver particles may be used to form the antimicrobial compositions.

In another implementation, the derivation of antimicrobial sub-micron size Silver particles is disclosed. The antimicrobial base may be synthesized from at least one Silver salt, a combination of Silver salts may be used. It may be understood that at least one Silver salt is water soluble. In one aspect, an aqueous solution (35% to 60% w/w) of the Silver salt may be used. Further, a plurality of monosaccharides may be used. The plurality of monosaccharides may be water soluble, used in an aqueous form with a concentration of 25% to 50% w/w. Furthermore, at least one derivative of polysaccharide may be used to synthesize the antimicrobial base. It may be understood that the derivative of the polysaccharide is water soluble. The polysaccharide may comprise a linear chain of β linked D-glucosamine and N-acetyl-glucosamine. Further, at least one modified polysaccharide may be used. The modified polysaccharide may be water soluble. Subsequently, a stabilizing agent may be used. The stabilizing agent may be a cellulose derivative, may be water soluble and used in a 0.5% to 2% w/w of total content. Further, at least one ligand may be used. The ligand may be a glycolic derivative. The glycol may be a lower glycol ether. Furthermore, an alkali may be used. The alkali may be an ionic metallic salt. Finally, a neutralizer may be used. It may be noted that the neutralizer is a buffering solution.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method for synthesizing an antimicrobial base, disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "treating," "digesting, "assessing," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described. The disclosed embodiments are merely examples of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

In recent times, there has been a huge demand for an antimicrobial solution that is effective, stable, and safe to use. Silver has been known to demonstrate an antimicrobial activity in ionic form, denoted as 'Ag+'. Ag+ is the chemically active valance of Silver. In its such valance, Silver shows biological activity too. Though Silver in form of $Ag^+$ was easily available, focus was on Silver in metallic form for using it as an antimicrobial, obviously as fine particles, may those be even adsorbed on some other finely divided solid. As immediate solution, ionisable Silver has been presented for usages as antimicrobial material by using a carrier solid such as titanium dioxide. The research has been continuing to obtain Silver in form as nano-particles by best possible route. There have been several references suggesting that the nanoparticles of Silver (AgNP) penetrate through the pores of human skin and may lead to cytotoxicity. A need for finding alternative Silver forms for application as antimicrobial was seen. The present invention aims to overcome the limitations of Silver nanoparticles and other conventional Silver antimicrobials.

Moreover, there is a need to develop antimicrobials capable of functioning at low dosage levels. In such attempts, one of the primary objectives may be to confirm anti-microbial activity of a material against a wide range of microbial species. Upon confirmation of the antimicrobial activity, a range of concentrations of the material may be tested to implement a minimum concentration at which the material shows antimicrobial activity. Further, the minimum concentration may be utilized in arriving at an antimicrobial product composition.

The present invention provides an antimicrobial base material to inhibit a microbial growth on articles treated with the antimicrobial base/composition and a method to synthesize the same. The antimicrobial base material is commercially favourable and has been arrived at after multiple variations in the reactant compositions and the reaction conditions to obtain sub-micron sized particles of silver suspended in an aqueous medium. Further, the antimicrobial base may be understood to form a stable suspension/dispersion for application purpose. In one example, the said dispersion may also be termed as a Colloidal. The antimicrobial base may function at a significantly low range of concentration to demonstrate an effective antimicrobial action against a range of pathogenic microbial species. The antimicrobial base may be derived from a silver salt, a plurality of monosaccharides, a derivative of a polysaccharide, a modified polysaccharide, a stabilizing agent, at least one ligand, an alkali, and a neutralizer.

The antimicrobial base may be synthesized using the Silver salt. It may be understood that the Silver salt is water soluble. In one aspect, an aqueous solution (35% to 60% w/w) of the Silver salt may be used. Further, a plurality of monosaccharides may be used for synthesizing the antimicrobial base. The plurality of monosaccharides may be used in an aqueous form with a concentration of 25% to 50% w/w. Furthermore, at least one derivative of polysaccharide may be used to synthesize the antimicrobial base. It may be understood that the derivative of the polysaccharide is water soluble. The polysaccharide may comprise a linear chain of β linked D-glucosamine and N-acetyl-glucosamine. Further, the modified polysaccharide may also be added to a reaction mixture. The modified polysaccharide may be water soluble. Subsequently, a stabilizing agent may be added to the reaction mixture. The stabilizing agent may be used in a 0.5% to 2% w/w aqueous form. Further, at least one ligand may be used. The ligand may be a glycolic derivative. Furthermore, an alkali like an ionic metallic salt may be added to the mix. Finally, a buffering solution may be used as a neutralizer in the reaction mixture.

It may be understood that the antimicrobial base disclosed in present invention may assist in preventing microbial growth on any objects and surfaces covered with the antimicrobial composition. While aspects of described method for synthesizing the antimicrobial base may be implemented in any number of different chemical reactant systems, environments, and/or compositions, the embodiments are described in the context of the following exemplary system.

The method described in following paragraphs may be rightly considered to comply as a Green chemistry approach for synthesizing the antimicrobial base. The Green chemistry approach is known to design chemical processes in a way that reduces and eliminates the formation of the hazardous substances. Further, the green chemistry may be understood to be applied in designing, manufacturing, application, and even the ultimate disposal of the disclosed antimicrobial present in a composition. The present disclosure does not use any harmful reactants, and does not produce any harmful effluents, intermediates and by-products thereby reducing the requirement for effluent treatment.

The present disclosure is principally based on the interactions between a silver salt and a plurality of carbohydrates, wherein the silver salt is water soluble, and the plurality of carbohydrates may include, but not be limited to, a plurality of monosaccharides, a derivative of a polysaccharide, and a plurality of modified polysaccharides. It may be understood that different variations of reactants and reaction conditions may be followed before arriving at an optimal reaction. Similarly, the silver salt and the monosaccharides, the polysaccharides, and the modified polysaccharides may be tested in various permutations and combinations to identify best yielding combinations.

Figure 1:
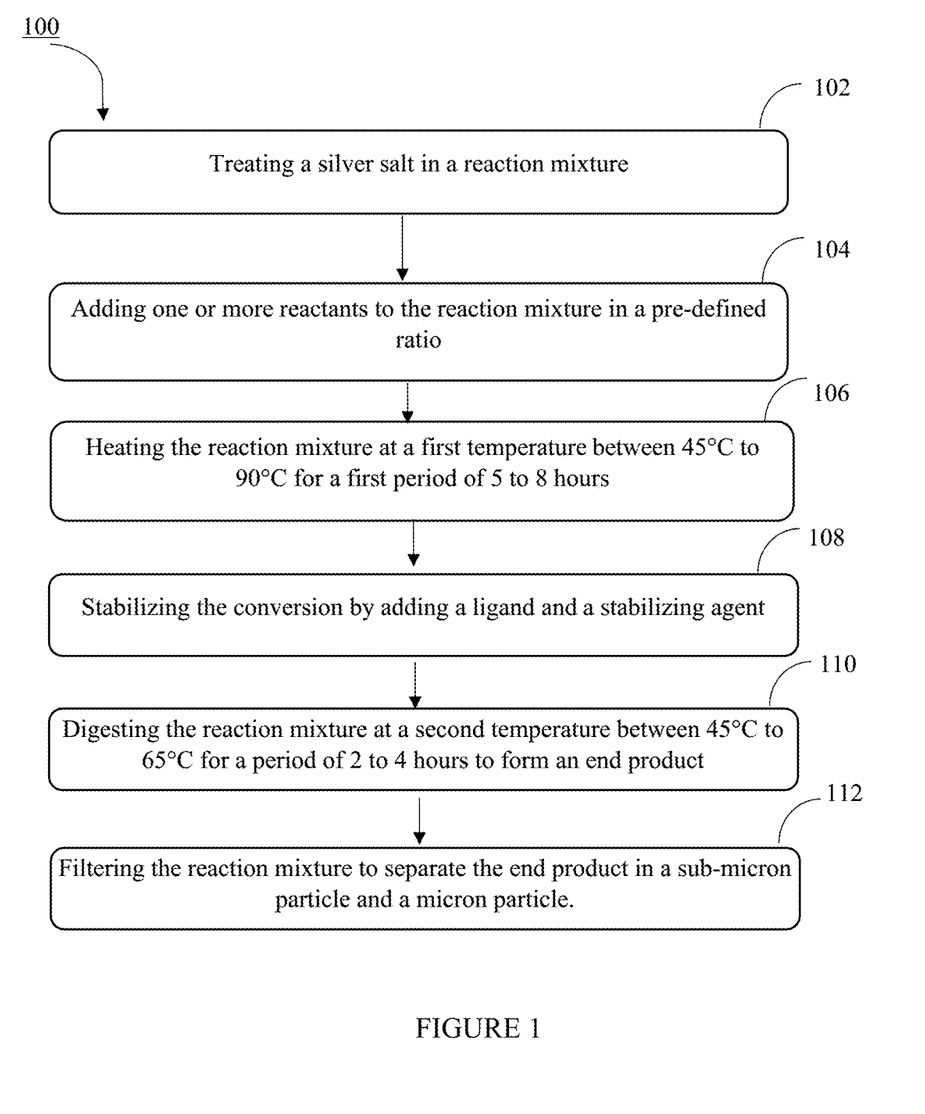
FIG. 1 illustrates a method for synthesizing an antimicrobial base, in accordance with an embodiment of the present subject matter, in accordance with an embodiment of the present subject matter.

Referring now to FIG. 1, a method 100 for synthesizing an antimicrobial base is disclosed in accordance with an embodiment of the present subject matter. The order in which the method 100 is described is not intended to be construed as a limitation, and any number of the described method-blocks can be combined in any order to implement the method 100 or alternate methods for synthesizing an antimicrobial base.

Additionally, individual blocks may be deleted from the method 100 without departing from the scope of the subject matter described herein. Furthermore, the method 100 synthesizing an antimicrobial base can be implemented with any suitable chemical reactants, alternatives of the reactants or combination thereof. However, for ease of explanation, in the embodiments described below the method 100 may be considered to be implemented as described in the method 100 for synthesizing the antimicrobial base.

At block 102, a silver salt may be treated in a reaction mixture followed by gradual addition of one or more reactants. The reaction mixture may be aqueous in nature. The silver salt may be used in a 35% to 60% w/w solution form. The silver salt may be understood as a chemical compound comprising an elemental Silver (Ag) bonded with a moiety (X). In one example, the X may be a halogen. The halogens are known to include 5 elements, namely: Fluorine (F), Chlorine (Cl), Bromine (Br), and Iodine (I). Further, the silver salt may include, but not be limited to, Silver Bromide (AgBr), Silver Chloride (AgCl), Silver Iodide (AgI), and Silver fluoride (AgF). In one example, a Silver salt other that Silver halides may be preferentially used. In another example, the silver salt may be a Silver compound such as Silver nitrate ($AgNO_3$). The Silver compound may be used in an aqueous solution form. In another example, combinations of Silver salts may be used. In yet another example, a silver halide may be used with a water-soluble Silver salt.

At block 104, one or more reactants may be added to the reaction mixture in a pre-defined ratio. The one or more reactants may be one of a monosaccharide, a polysaccharide, a derivative of polysaccharide, a modified polysaccharide, and a biopolymer. It may be pertinent to note that the one or more reactants are added to the reaction mixture in the pre-defined ratio. Further, a quantum (w/w) of the one or more reactants may be 3 to 8 times in equivalent to a quantum (w/w) of the silver salt. In one example, if the quantum of the silver salt may be 'x' then the quantum of the reactant may be in the range of '3x' to '8x'. Further, the one or more reactants may be added in a 25% to 50% w/w solution form. Further, the one or more reactants added in the reaction mixture may be in a 1:1 ratio with each other. In one example, two different monosaccharides may be added to the mixtures in a 1:1 ratio. It may be understood that the pre-defined ratios of reactants may be associated with a certain thermodynamic energy, and entropy. Further, in order to obtain a desirable shape of the Silver particles, the pre-defined ratios of reactants associated with the certain thermodynamic energy, and entropy need to be studied and optimized.

In one example, the monosaccharide may comprise Glucose and Fructose. In one example, a dextrorotatory (D) form of Glucose, i.e., D-Glucose may be used. In another example, a dextrorotatory (D) form of Fructose i.e., D-Fructose may be used. It may be noted that the D-Glucose and the D-Fructose may be used in aqueous solution form. In one embodiment, the method 100 may also comprise an oxidoreductase enzyme to bring about conversion of the monosaccharide to a deoxygenated form. In one example, the method 100 may involve conversion of the D-Glucose to 2-Deoxy-D-Glucose (2DG). It may be understood that the reactant D-Glucose may be converted to the product 2DG towards the end of the reaction. Hence, the antimicrobial base may comprise 2DG substance.

Further, the antimicrobial base may be used to formulate an antimicrobial composition. Therefore, after applying of the antimicrobial composition on an object, any microbial organisms or microbes encountering the treated object will be facing the 2DG instead of D-Glucose. Further, the microbes may be unable to complete a metabolic assay, due to lack of oxygen atoms in the substance. Consequently, the microbes would be unable to derive energy from the 2DG as compared to that from Glucose. The energy shortage in the microbial cell would eventually lead to death of the microbial cell. Therefore, the conversion of the D-Glucose into the 2DG also contributes to the antimicrobial activity along with the $Ag^0$ particles of the disclosed antimicrobial base.

Further, example of the polysaccharide includes a starch and a cellulose. Example of the modified polysaccharide includes a polysaccharide that is treated physically, enzymatically, and chemically to make the polysaccharide more suitable for a desired application. In one example, the modified polysaccharide may be a modified starch. In other example, the modified polysaccharide may be a modified cellulose.

In one example, the derivative of polysaccharide may be Chitosan. The Chitosan may be understood as a linear polysaccharide comprising randomly distributed β-linked D-glucosamine and N-acetyl-glucosamine. In one example, a dispersion of the chitosan may be used.

Further, a biopolymer may be understood to be a natural polymer produced by a cell of a living organism. Furthermore, the biopolymer may consist of several monomeric units that are covalently bonded to form a larger molecule. In one example, papaya extract may be used with an AMPS polymer and a CMC. The AMPS polymer may be understood as 2-Acrylamido-2-methylpropane sulfonic acid and the CMC may be understood as Carboxymethyl cellulose.

At block 106, the reaction mixture may be heated at a first temperature between 45° C. to 90° C. for a first period of 5 to 8 hours. During the heating, a plurality of Silver ions ($A^+$) from the silver salt may be converted to a plurality of colloidal silver particles ($Ag^0$). Further, the pH of the reaction mixture during heating may be maintained between 8.0 to 10.5 using a neutralizer and an alkali. It may be noted that the neutralizer is a buffering solution, and the alkali is an ionic metallic salt or and ionic salt of an alkaline earth metal.

The alkali may be understood to function as a base that dissolves in water. In one example, the alkali used may be a Sodium hydroxide, also commonly known as 'caustic soda'. In another example, the alkali may be a Magnesium hydroxide or similar alternative.

Subsequently, the neutralizer may be understood as a buffering solution to maintain and resist change in a pH of a solution. Therefore, the neutralizer may be used as per requirement. In one example the neutralizer may be a phosphate buffer. In another example, the neutralizer may be a citrate buffer. In yet another example, the neutralizer may be a borate buffer. It may be understood that a strength and a pH of the neutralizer may be adjusted as per the requirement. Further, a series of strengths and pH may be included in trial in order to determine an optimal pH and an optimal strength of the neutralizer.

At block 108, the conversion of the plurality of silver ions ($Ag^+$) from the Silver salt to the plurality of colloidal silver particles ($Ag^0$) may be stabilized by adding a ligand and a stabilizing agent in the reaction mixture. The ligand may be a glycolic derivative and the stabilizing agent may be a cellulose derivative. In one example, the stabilizing agent may be used in a 0.5% to 2% w/w aqueous form.

The stabilizing agent may be derived from carbohydrates and hence be termed as derivatives of the carbohydrate. In one example, the stabilizing agent may be Hydroxyethyl cellulose which is derived from a Cellulose. In another example, the stabilizing agent may be a Hydroxypropyl cellulose. In yet another example, the stabilizing agent may be a Methyl cellulose. Other examples of stabilizing agent may include a carbohydrate modified by a fatty acid, a saccharide, and also a protein. Further, the ligand may be understood as a coupling molecule or a molecule that binds to another atom to form a co-ordination complex. The ligands may be categorized as anions, cations and neutral molecules or by certain disposition of functional groups in a compound which can form hydrogen bonding with Silver, which also holds certain orbital energy of Silver atoms. In one example, the ligand used may be a polyglycol. In another example, the ligand used may be a di-propylene glycol.

At block 110, the reaction mixture may be digested at a second temperature between 45° C. to 65° C. for a second period of 2 to 4 hours to form an end product. The digestion may be understood to be a chemical breakdown process that digests a complex compound into a simpler compound. In one example, the digestion may be carried out by using a hydrolyse enzyme leading to a hydrolysis reaction. In other example, the digestion may be facilitated by a controlled temperature change that may lead to weakening of previous chemical bonds to breakdown of the complex compound into the simpler compound.

At block 112, the end product may be filtered and separated into a micron particle, and a sub-micron particle. It may be understood that the separation is based on molecular size. The sub-micron particle may form a dispersion containing the colloidal silver particles ($Ag^0$) and the dispersion may be referred to as the antimicrobial base. The antimicrobial base may comprise the $Ag^0$ and a plurality of the 2-deoxy-D-Glucose molecules (2DG) plus other additives from reaction mix.

In one example, the end product may be filtered to separate the particles into micron particles, and sub-micron particles. In another example, the end product may be passed through a membrane filter to separate particles based on their molecular sizes. Further, the sub-micron particle may be retained, and the micron particles may be reused in a subsequent reaction by converting them into a salt. It may be understood that the sub-micron particles combine through an irreversible process to form the antimicrobial base. The sub-micron particles are combined based on the principles of solid-state chemistry. Further, a zeta potential ($\zeta$) of the sub-micron particles may be falling within a range that would support formation of the colloidal silver particles ($Ag^0$).

The Zeta potential may be understood as a physical property which is exhibited by any particle in a suspension, and an emulsion. It may be understood that the Zeta potential is a measure of a magnitude of an electrostatic charge or a repulsion charge or an attraction charge between a set of particles in a solution. The Zeta potential may be used to optimize a formulation in terms of consistency and stability. Therefore, working around Zeta potential may reduce time spent in producing the antimicrobial base. In one example, the Zeta potential for the antimicrobial base may be greater than 61 mV. In another example, the Zeta potential may be in the range of ±40 to ±60.

It may be pertinent to note that, the antimicrobial base comprises the plurality of colloidal Silver particles ($Ag^0$). The $Ag^0$ may also be understood to be 'colloidal silver'. The $Ag^0$ may be understood to be of sub-micron size in a neutral form. Further, the size of $Ag^0$ may be less than $10^{-6}$ metre and greater than $10^{-9}$ metre. The $Ag^0$ may not constitute Silver nano particles and only constitute colloidal particles that are sub-micron in nature. Thus, from the disclosed antimicrobial base, the $Ag^0$ silver particles may not penetrate the human skin unlike the Silver nanoparticles and hence may be safe to use. Further, the $Ag^0$ may be derived and stabilized by following certain principles of the Solid-State chemistry and by identifying suitable reaction conditions. In one example, a polymorphism was observed for the Silver particles. Further, it may be understood that the polymorphism includes several polymorphs of Silver. Hence, the $Ag^0$ may be polymorphic demonstrating several polymorphs. It may also be noted that one polymorph may be changed to another polymorph at a certain temperature and by following certain process known as a transition.

The transition may be understood to be thermodynamically reversible, enantiotropic or enantiomorphic. On the other hand, a thermodynamically irreversible transition may be achieved by providing a suitable temperature and a set of suitable reaction conditions. The irreversible transition may be understood to provide higher quantity of silver particles that are monotropic in nature. The monotropic particles may be understood to be meta stable form of the Silver particles over a wide range of temperature. Therefore, such reaction may provide monotropic $Ag^0$ that may exhibit multiple crystal structures, but in the present case, this is largely avoided.

It may be understood that co-existence of the multiple crystal structures of the $Ag^0$ may continue in the aqueous phase over a long period of time and during storage of the antimicrobial. Further, the multiple crystal structures may also provide different surface area and possess different surface energy towards the micro-organisms. Therefore, the micro-organisms may find it difficult to grow on the crystal structures of $Ag^0$ even when such crystals are together.

Figure 2:
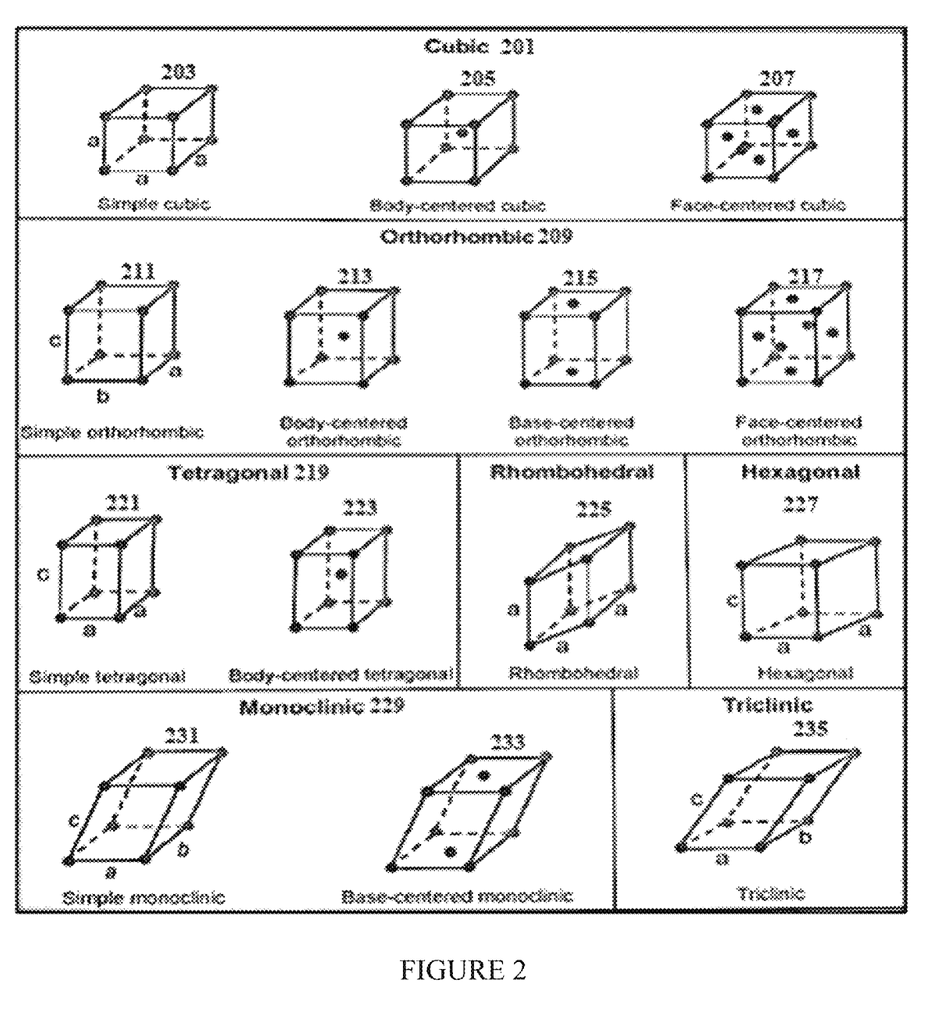
FIG. 2 illustrates an exemplary illustration with different shapes of the $Ag^0$ particles, in accordance with the present subject matter.

Further, the polymorphism may be characterized by different shapes of the $Ag^0$ particles as shown in the FIG. 2.

Referring now to FIG. 2, an exemplary illustration of 7 main types of possible shapes of the $Ag^0$ particles is shown. As illustrated, the $Ag^0$ particles may be cubic 201 in shape. Further, the cubic 201 shape may be characterized in three subtypes—a Simple cubic 203, a body-centered cubic 205, and a face-centered cubic 207. Furthermore, the $Ag^0$ particles may be orthorhombic 209 in shape. The orthorhombic 209 shape may be further characterized as a simple orthorhombic 211, a body-centered orthorhombic 213, a base-centered orthorhombic 215, and a face-centered orthorhombic 217. Furthermore, the $Ag^0$ particles may be tetragonal 219 in shape. The tetragonal 219 shape may be characterized as a simple tetragonal 221 and a body-centered tetragonal 223. Further, the $Ag^0$ particles may be rhombohedral 225 in shape. In one aspect, the $Ag^0$ particles may be hexagonal 227 in shape. In another aspect, the $Ag^0$ particles may be monoclinic 229 in shape. The monoclinic 229 shape may be further characterized as a simple monoclinic 231 and a base-centered monoclinic 233. Finally, the $Ag^0$ particles may be triclinic 235 in shape.

As illustrated in the FIG. 2, in the monoclinic 229 type, the shape of a particle, may be described by a vector of unequal lengths, as in the orthorhombic 209 shape. The vectors may form a rectangular prism with a parallelogram as its base. Hence, two pairs of vectors are perpendicular meeting at right angles, while the third pair makes an angle other than 90°.

Further, in the Triclinic 235 shape may be understood to have no symmetry at all, or that it has only a center of symmetry. Minerals crystallizing in the triclinic 235 shape have symmetry lower than each of the six other shapes. There are no rotational axes of symmetry and no mirror planes in the system. Further, the $Ag^0$ particles of the Triclinic 235 shape may also be understood to provide larger surface area as compared to the $Ag^0$ particles in any of the other shapes as shown in FIG. 2. The larger surface area of the Triclinic 235 shape may allow larger number of the micro-organisms to settle on the $Ag^0$ particles as compared to the $Ag^0$ particles of any other shape which would be smaller. Hence, the reaction conditions in the present disclosure may be optimized to achieve majority $Ag^0$ particles in the Triclinic 235 shape in order to kill more micro-organisms.

Figure 3:
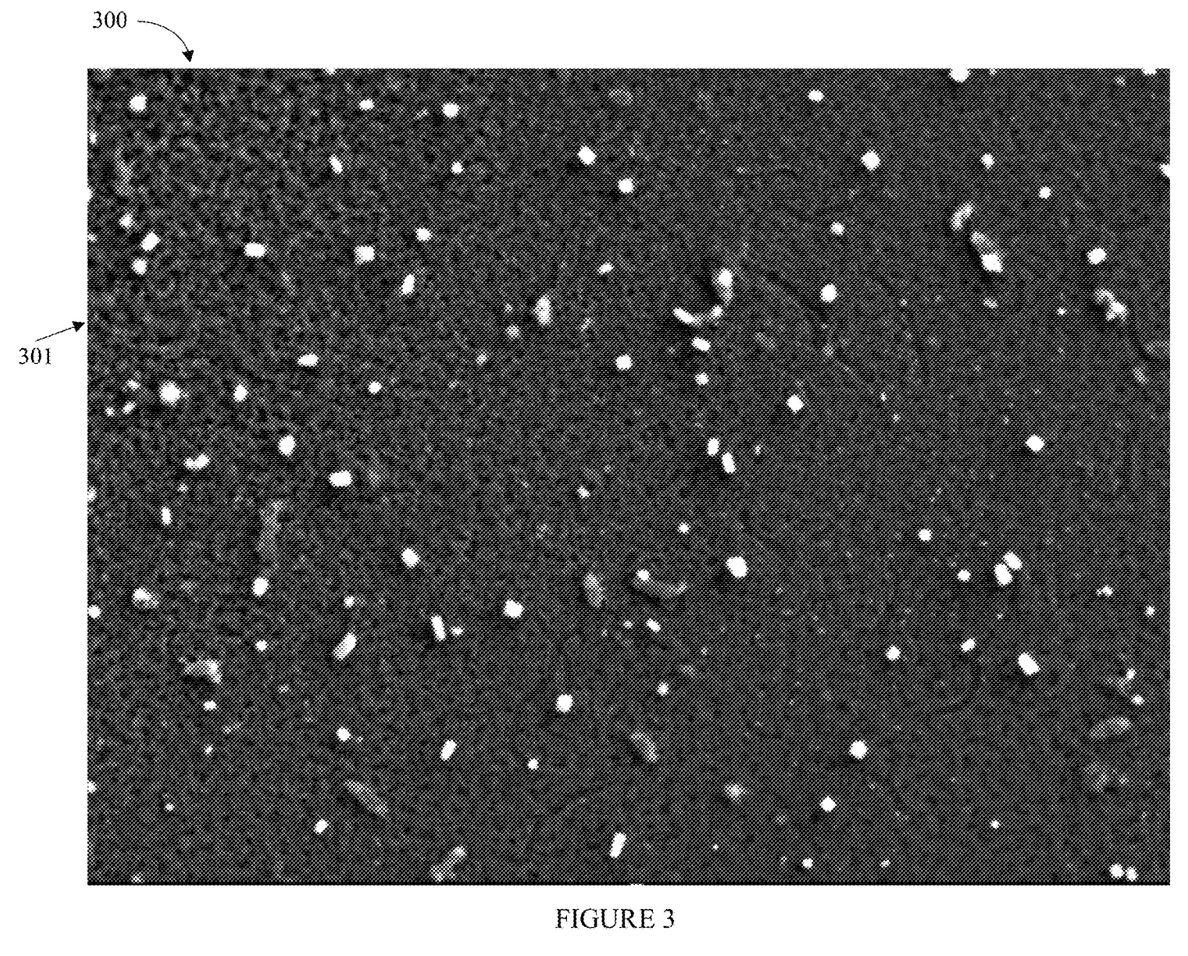
FIG. 3 and FIG. 4 illustrate exemplary embodiments in accordance with the present subject matter.

Referring now to FIG. 3, an exemplary Scanning Electron Microscopic image 300 in accordance with the present disclosure is illustrated. A plurality of the $Ag^0$ particles 301 in white color may be seen. As illustrated, the shape of the $Ag^0$ particles 301 is not Cubic (FCC), and Spherical but appears to be Triclinic which may be aimed for, though a couple of cubic particles as also spherical ones may also be seen in minority.

Figure 4:
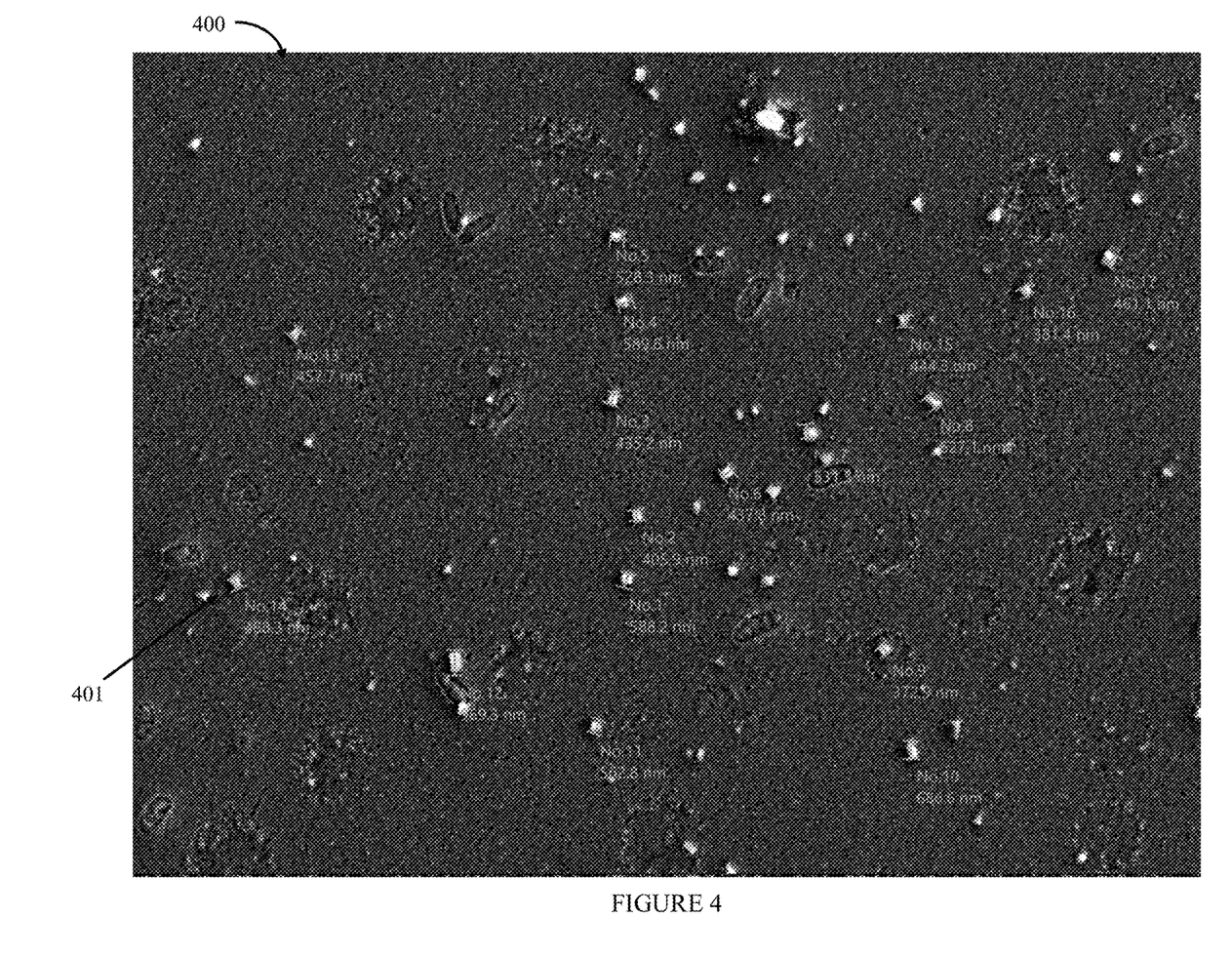

Referring now to FIG. 4, an exemplary Scanning electron microscope image 400 in accordance with the present disclosure is illustrated. In one example, the $Ag^0$ particles synthesized from the present disclosure may be of the triclinic 233 shape. Therefore, any microbial organisms may not be able to orient but face the surface of $Ag^0$ and eventually die.

Further, an average size of the $Ag^0$ particles may be measured by Scanning Electron Microscopy (SEM). A plurality of the $Ag^0$ particles 401 in white color may be seen. Further, sizes of each of the $Ag^0$ particle may be recorded. Furthermore, an average size of the $Ag^0$ particles may be calculated as 498 nm. It may be understood that the average size of a nano particles may be up to 100 nm. Hence, the $Ag^0$ particles may be regarded to be submicron particles larger in size than the nanoparticles.

It may be noted that a yield of 35 to 62% of the $Ag^0$ may be achieved using specific configurations of all reactants at given reaction conditions. Further, the disclosed antimicrobial base may be found to be effective at a low ppm of 3 to 80 ppm depending on application usage which is quite low as compared to conventional antimicrobials.

Furthermore, the method 100 may also comprise formulating the antimicrobial base into an antimicrobial composition. The antimicrobial base may be sprayed or applied on a surface of an object to protect the object from a microbial growth. The antimicrobial base is found to be effective against a wide range of pathogenic microbes including several bacteria, viruses, protozoans, and fungi.

EXPERIMENTS AND RESULTS

Example 1

In order to explain the method for synthesizing the antimicrobial base in more detail, consider below experiments performed with a Silver salt as an exemplary embodiment in accordance with the present subject matter. Different constituents may be used in the method. In one example, the silver salt comprising 40 to 60% aqueous solution of the silver salt may be used.

Further, the silver salt may be treated with a reaction mixture one or more reactant, wherein the reactant is a derivative of polysaccharide, a monosaccharides, a modified polysaccharide. Further a stabilizing agent, a ligand, an alkali, and a neutralizer may be added to reaction mixture. The derivative of polysaccharide may be an 8 to 15% dispersion of a Chitosan. The Chitosan may be pre-treated by an enzyme hydrolyse. The plurality of monosaccharides may be a 25% to 50% aqueous solution of D-Glucose and a 25% to 50% aqueous solution of D-Fructose. The modified polysaccharide may be a 15% to 25% aqueous solution of a modified starch and an 8% to 10% aqueous solution of a modified cellulose. The modified cellulose may be pre-treated with a Caustic solution. The stabilizing agent may be a 2% to 5% aqueous solution of Hydroxy ethyl cellulose. The ligand may be an 8 to 30% solution of a polyglycol and an 8% to 20% solution of a Di-propylene glycol. The alkali may be a 40% to 47% Caustic soda solution. The neutralizer may be a buffer solution with a pH between 6.8 to 8.2. A yield of 35% to 62% of $Ag^0$ particles may be achieved using the exemplary details. In some cases, optimization may lead to yield of 52% to 68% of $Ag^0$ particle with certain reaction-compositions.

Example 2

In one exemplary embodiment, a Silver nitrate solution may be used as a Silver salt. Further, a reactor vessel may be taken and a stirrer may be fitted to the reactor vessel. The reactor vessel may be connected to a heating device. Further, a reaction mixture may be made. The reaction mixture may be aqueous in nature. To prepare the reaction mixture, glucose may be added followed by Starch powder. Further the Silver nitrate solution may be added. Subsequently mixed glycols may be added to the reaction mixture followed by caustic lye and water. Further the reaction mixture may be digested at 40° C. to 65° C. for a period of 6 to 8 hours. Furthermore, hydroxyl ethyl cellulose may be added to the reaction mixture to stabilize the conversion.

Example 3

In another exemplary embodiment, a Silver nitrate solution may be used as a Silver salt. Further, a reactor vessel may be taken and a stirrer may be fitted to the reactor vessel. The reactor vessel may be connected to a heating device. Further, a reaction mixture may be made. The reaction mixture may be aqueous in nature. To prepare the reaction mixture, Chitosan may be added followed by AMPS cationic polymer, CMC, water, thioglycerine, glycol, water and the silver nitrate solution. Further the reaction mixture may be digested at a temperature of 40° C. to 55° C. for a period of 9 to 10 hours. Furthermore, the temperature may be increased to 90° C. Subsequently the reaction mixture may be neutralized by adding acetate buffer.

Example 4

In yet another exemplary embodiment, a Silver nitrate solution may be used a Silver salt. Further, a reactor vessel may be taken and a stirrer may be fitted to the reactor vessel. The reactor vessel may be connected to a heating device. Further, a reaction mixture may be made. The reaction mixture may be aqueous in nature. To prepare the reaction mixture, a papaya extract, CMC, AMPS polymer, water, glycol, caustic lye may be added followed by the Silver nitrate solution. Further, the reaction mass may be digested at 40° C. to 98° C. for 9 to 10 hours and stirred for another 5 hours at 45° C. The reaction mixture may be neutralized by citrate buffer.

The antimicrobial base synthesized in above examples, may be used to formulate an antimicrobial composition. Further, the antimicrobial composition may be sprayed or applied on any object or any surface to be protected from a microbial growth. After spraying or applying the antimicrobial composition, the object may be dried for a couple of hours and then used. Example of the object may include a Personal Protective Equipment (PPE) kit, gloves, socks, shoes, and apparels. In one example, the antimicrobial base may be utilized to manufacture an antimicrobial textile inhibiting any microbial growth on the surface of the antimicrobial textile. The antimicrobial textile may comprise fashion textile as well as functional textiles. The fashion textiles may be understood to be used by individuals for clothing. Further, the functional textiles may comprise curtains, drapes, packaging materials and the like.

In one experiment, the $Ag^0$ particles were monitored for a period of six months during which no change in antimicrobial activity was seen. Same level of antimicrobial activity was observed before and after 6 months duration. This suggests that the antimicrobial base is stable over a prolonged period of time.

Exemplary embodiments discussed above may provide certain advantages. Though not required to practice aspects of the disclosure, these advantages may include those provided by the following features.

Some embodiments of the method provide an antimicrobial base for all kinds of commonly used apparels.

Some embodiments of the method provide an antimicrobial base for surgical masks, PPE kits, aprons, and gloves used by doctors, nurses, medical professionals.

Some embodiments of the method provide an antimicrobial base for disinfecting surfaces in hospitals, laboratories, and ambulances.

Some embodiments of the method provide an antimicrobial base for synthesizing virus resistant fabrics.

Some embodiments of the method promote and maintain antimicrobial and safe environment.

Some embodiments of the method prevent transmission of bacterial, viral, and fungal infections.

Although implementations for methods for synthesizing an antimicrobial base have been described in language specific to structural features and/or methods, it is to be understood that the appended claims are not necessarily limited to the specific features or methods described. Rather, the specific features and methods are disclosed as examples of implementations for synthesizing an antimicrobial base.

What is claimed is:

1. A method for synthesizing an antimicrobial base, the method comprising:

treating a silver salt in a reaction mixture, wherein the silver salt is a 35% to 60% w/w solution, and wherein the reaction mixture is aqueous in nature;

adding one or more reactants to the reaction mixture, wherein the one or more reactants is at least one of a monosaccharide, a polysaccharide, a derivative of polysaccharide, a modified polysaccharide, and a biopolymer, and wherein the one or more reactants form a reactive agent, and wherein a volume of the one or more reactants is 3 to 8 times in equivalent to the volume of the silver salt, and wherein the one or more reactants is added to the reaction mixture as a 25% to 50% w/w solution;

heating the reaction mixture at a first temperature between 45° C. to 90° C. for a first period of 5 to 8 hours, wherein a plurality of silver ions ($Ag^+$) from the silver salt is converted to a plurality of colloidal silver particles ($Ag^0$), and wherein the pH of the reaction mixture is maintained between 8.0 to 10.5 using a neutralizer and an alkali, and wherein the neutralizer is a buffering solution, and wherein the alkali is an ionic metallic salt;

stabilizing the conversion by adding a ligand and a stabilizing agent, wherein the ligand is a glycolic derivative, and wherein the stabilizing agent is a cellulose derivative, and the stabilizing agent is added as a 0.5% to 2% w/w aqueous solution to the reaction mixture;

digesting the reaction mixture at a second temperature between 45° C. to 65° C. for a second period of 2 to 4 hours to form an end product; and filtering the reaction mixture to separate the end product into a sub-micron particle and a micron particle, wherein the sub-micron particle contains the colloidal silver particles ($Ag^0$), thereby forming the antimicrobial base;

wherein at least one of the colloidal silver particles has a triclinic shape.

2. The method as claimed in claim 1, wherein the $Ag^0$ is in a monotropic and a polymorphic form, and wherein the stabilizing is continued until a zeta potential is in a range of ±40 mV to ±60 mV, and wherein the stabilizing is an irreversible reaction.

3. The method as claimed in claim 1, wherein the one or more reactants comprises D-glucose as the monosaccharide, and the antimicrobial base includes 2-deoxy-D-glucose molecules (2DG) synthesized from the D-glucose.

4. The method as claimed in claim 1, wherein the one or more reactants are in a 1:1 weight ratio to each other.

5. The method for synthesizing an antimicrobial base as claimed in claim 1, wherein a majority of the colloidal silver particles have the triclinic shape.

* * * * *